C. H. DE LA MONTE.
SHOCK ABSORBER.
APPLICATION FILED AUG. 7, 1913.
1,099,539.
Patented June 9, 1914.
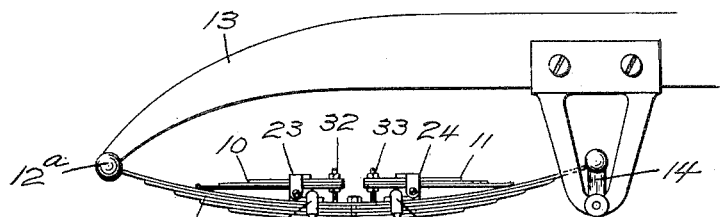
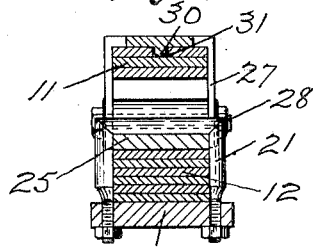
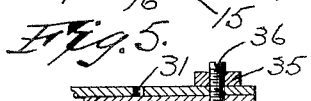
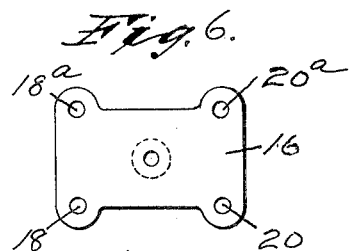
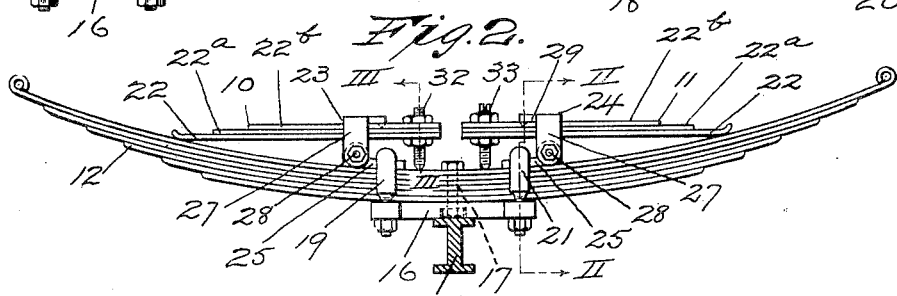
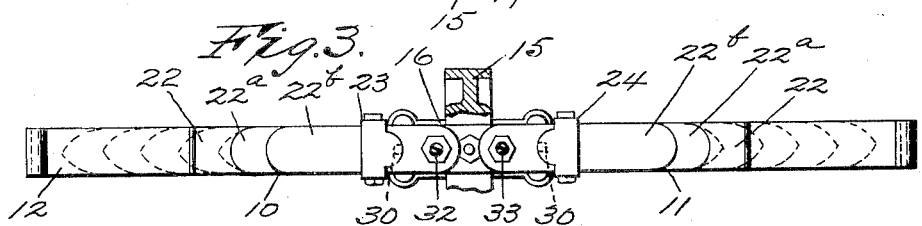
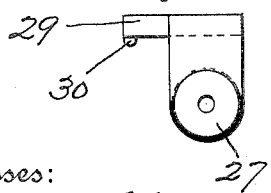
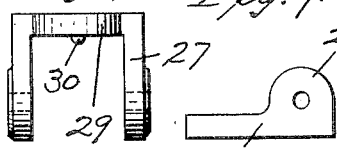
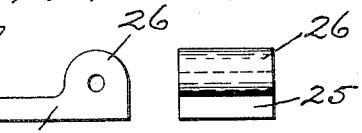

UNITED STATES PATENT OFFICE.

CASCIOUS H. DE LA MONTE, OF NEW YORK, N. Y.

SHOCK-ABSORBER.

1,099,539.

Specification of Letters Patent.

Patented June 9, 1914.

Application filed August 7, 1913. Serial No. 783,530.

*To all whom it may concern:*

Be it known that I, CASCIOUS H. DE LA MONTE, a citizen of the Republic of Mexico, and a resident of New York, county and State of New York, have invented a certain new and useful Improvement in Shock-Absorbers, of which the following is a full, clear, and exact specification.

This invention relates to a class of devices adapted to be used in conjunction with vehicles.

It is commonly known that it is impossible to provide upon an automobile, or similar vehicle forms of springs adapted to meet the varied conditions of road-beds traversed. Springs which are suitable for smooth roads are invariably too flexible for rough roads, and when the latter are encountered the springs recoil with such rapidity after compression that the shock, or jar therefrom makes riding in the vehicle very uncomfortable. Moreover, the frequent jars of especially automobiles causes the parts of the mechanism thereof to become loosened, and frequent vibrations of the springs cause crystallization of the metal which makes them susceptible to breakage.

My invention has for its object primarily to overcome these objections by providing a shock absorber adapted to be applied upon the laminated springs of automobiles, or other vehicles so as to serve for arresting the recoil after compression when the wheels of the vehicle encounter inequalities while traveling over highways, and wherein two resilient members are fulcrumed to each spring of the vehicle in a manner whereby the sharp flexure of the springs resulting from sudden jarring of the wheels will be automatically offset, thereby preventing shocks from being imparted to the body of the vehicle as well as overcoming practically all vibrations of the springs, in order to obviate their susceptibility to breakage arising from such conditions.

Another object of the invention is to provide an adjusting element upon each of the resilient members of the device, and which serves as means to permit one or both members to be suitably adjusted to conform with the tension of the vehicle spring to which it is applied so that the flexibility of all the springs of the vehicle may be equalized as occasion requires.

A further object of the invention is to provide a shock absorber wherein its members may be composed of one, or a plurality of superimposed plates, or leaves of spring metal, each of which may be of the same resiliency, or of different resiliency so that the device may be constructed to be equally adapted for use in conjunction with light, or heavy springs.

With these and other objects in view, the invention will be hereinafter more particularly described with reference to the accompanying drawing, which forms a part of this specification, and will then be pointed out in the claims at the end of the description.

In the drawing, Figure 1 is a fragmentary view, showing part of the frame of an automobile and one of the springs thereof with a side elevation of one form of shock absorber applied thereto. Fig. 2 is an enlarged side view of a vehicle spring showing the device applied thereto. Fig. 3 is a top plan of the device and vehicle spring shown in Fig. 2. Fig. 4 is a section taken on the line II—II of Fig. 2. Fig. 5 is a section taken on the line III—III of Fig. 2. Fig. 6 is a plan of the supporting plate used in conjunction with the device. Fig. 7 is a side view of a bar used in the device. Fig. 8 is an end view of said bar. Fig. 9 is an end elevation of one of the straddle bars employed in the device, and Fig. 10 is a side view of one of the straddle bars.

The device, or shock absorber has two resilient members, as 10 and 11, both of which are constructed so as to be adjustably applied upon the top surface of a common form of laminated spring, as 12, having one of its ends pivoted, at $12^a$, to a portion of the frame 13 of an automobile, or other vehicle, and the other end of the spring may be connected to the frame 13 by a swinging link 14.

To the axle, as 15, of the vehicle may be secured in any suitable manner a supporting plate 16 which is also fastened to the spring 12 by a bolt 17 directed through registered openings centrally of said supporting plate and midway of the vehicle spring, respectively. At one of the ends of the supporting plate 16 are spaced openings 18 and $18^a$ through which are passed the free threaded ends of the arms of an inverted U-shaped straddle strap 19, and said strap is adjustably held to the plate by nuts screwed on the threaded ends thereof. At the other end of the supporting plate 16 are spaced openings 20 and 20ᵃ through which are directed the free threaded ends of the arms of a similar inverted U-shaped straddle strap 21, and this strap is also adjustably held to said plate by nuts screwed on its threaded ends. Both of the straddle straps 19 and 21 are guided over the spring 12 of the vehicle, and said straps are of sufficient lengths to extend some distance above the spring so as to provide a space therebetween.

The members 10 and 11 of the shock absorber are alike in formation, and each of said members is composed of one, or a plurality of superimposed plates, or leaves 22, 22ᵃ, 22ᵇ. The plates 22, 22ᵃ, 22ᵇ are preferably of different lengths, the plate 22 being adjacent to the top surface of the spring 12, and said plate 22 has one of its ends slightly curved so as to be arranged in movable contact with the top surface of the spring. The leaves of the members 10 and 11 are of spring metal, and the leaves of each member may be of the same tension, or may vary in tension whereby the resiliency of both members may conform to vehicle springs of different flexibility as occasion requires.

The central portion of each of the resilient members 10 and 11 is fulcrumed to the spring of the vehicle, and serving as means to accomplish this, I provide pivoting elements, as 23 and 24, which are similarly constructed. Each of the pivoting elements 23 and 24 is composed of a fulcrum bar 25 which is disposed in one of the spaces between the spring 12 and one of the straps 19 and 21 so that both of the bars rest upon said spring longitudinally thereof. The bars 25 are of lengths whereby their relative right and left ends extend to approximately the central part of each of the members 10 and 11, and at this end of each of said bars is a head 26. Over the head 26 of each of the bars 25 are movably guided the free ends of an inverted straddle bar 27 which is also guided over one of the members 10 and 11, and each of said straddle bars is pivotally connected to the head of each of the bars 25 by a bolt 28 which is passed through registered openings in said heads and in the ends of the straddle bars. Formed upon the upper part of each of the straddle bars 27 is a lug 29. Both of the lugs 29 extend toward each other in alinement, and upon the underside of each of said lugs is a knob 30 which is seated in a recess 31 provided in the upper leaf 22ᵇ of each of the members 10 and 11 whereby the members may be held to the vehicle spring against accidental displacement.

Serving to permit the members 10 and 11 to be suitably adjusted for arresting the recoil of the vehicle spring, through threaded openings provided in said members adjacent to the opposed ends thereof are adjusting elements, or bolts, as 32 and 33, the lower ends of both of which are normally in contact with the spring 12. The adjusting bolts 32 and 33 may be of any desired shape, but I prefer to employ forms of bolts upon each of which may be screwed tightening nuts, as 34 and 35, which are arranged to abut against the upper and lower surfaces, respectively, of each of the members 10 and 11. The top end of each of the adjusting bolts is slotted, at 36, so that by the use of a suitable tool the bolts may be rotated to swing the opposite ends of the resilient members 10 and 11 in snug, or freely movable engagement with the spring of the vehicle. By providing the members 10 and 11 of suitable tension, and by accurately regulating the members through the medium of the adjusting bolts 32 and 33, as above described, all recoil of the vehicle springs after compression will be arrested by the shock absorber when the wheels of the vehicle encounter inequalities while traveling over highways, thereby preventing all shocks or jars from being imparted to the body of the vehicle and overcoming practically all vibrations of the springs so as to obviate their susceptibility to breakage from crystallization of the metal as well as tending to prevent loosening of the parts of the operating mechanism arising from such conditions when the device is employed upon automobiles.

In the foregoing description, I have embodied the preferred form of my invention, but I do not wish to be understood as limiting myself thereto, as I am aware that modifications may be made therein without departing from the principle, or sacrificing any of the advantages of this invention, therefore I reserve to myself the right to make such changes as fairly fall within the scope of the appended claims.

Having thus described my invention, I claim as new and desire to secure by Letters Patent:—

1. In a shock absorber, the combination with the spring of a vehicle, of a resilient member fulcrumed upon the top of the spring in a manner whereby one end thereof is in normal contact with the spring and in the path of flexure of said spring, and an adjusting element provided at the other end of the resilient member, said element serving when operated to adjust the resilient member relatively to the spring for arresting the recoil of the spring after its compression.

2. In a shock absorber, the combination with the spring of a vehicle, of two corresponding resilient members, both being fulcrumed upon the top of the spring in a manner whereby the opposite ends thereof are in normal contact with the spring and in the path of flexure of said spring, and two adjusting elements one provided at the other end of each of the resilient members, said elements serving when operated to adjust the resilient members relatively to the spring for arresting the recoil of the spring after its compression.

3. In a shock absorber, the combination with the spring of a vehicle, of a resilient member composed of a plurality of superimposed leaves fulcrumed upon the top of the spring in a manner whereby one end of the lower leaf is in normal contact with the spring and in the path of flexure of said spring, and an adjusting element provided at the other end of the resilient member, said element serving when operated to adjust the resilient member relatively to the spring for arresting the recoil of the spring after its compression.

4. In a shock absorber, the combination with the spring of a vehicle, of two corresponding resilient members, each composed of a plurality of superimposed leaves and both of said members being fulcrumed upon the top of the spring in a manner whereby one end of the lower leaf of each member is in normal contact with the spring and in the path of flexure of said spring, and two adjusting elements, one provided at the other end of each of the resilient members, said elements serving when operated to adjust the resilient members relatively to the spring for arresting the recoil of the spring after its compression.

5. In a shock absorber, the combination with the spring of a vehicle, of a plurality of superimposed leaves of spring material, a pivoting element for fulcruming the leaves upon the top of the spring in a manner whereby one end thereof is in normal contact with the spring and in the path of flexure of said spring, and said leaves having registered openings at the other end thereof, and an adjusting bolt threaded in the openings of the leaves, said bolt serving when rotated to adjust the leaves relatively to the spring for arresting the recoil of the spring after its compression.

6. In a shock absorber, the combination with the spring of a vehicle, of two corresponding resilient members, each composed of a plurality of superimposed leaves, two pivoting elements, one fulcruming each of the resilient members upon the top of the spring whereby one end thereof is in normal contact with the spring and in the path of flexure of said spring, and each of said members having a threaded opening through its other end, and two adjusting bolts, one being threaded through the openings of each of the resilient members, said bolts serving when rotated to adjust the members relatively to the spring for arresting the recoil of the spring after its compression.

This specification signed and witnessed this sixth day of August A. D. 1913.

CASCIOUS H. DE LA MONTE.

Witnesses:
ROBT. B. ABBOTT,
M. DERMODY.